US011915714B2

(12) United States Patent
Morrison et al.

(10) Patent No.: US 11,915,714 B2
(45) Date of Patent: Feb. 27, 2024

(54) NEURAL PITCH-SHIFTING AND TIME-STRETCHING

(71) Applicants: Adobe Inc., San Jose, CA (US); Northwestern University, Evanston, IL (US)

(72) Inventors: Maxwell Morrison, Evanston, IL (US); Juan Pablo Caceres Chomali, San Francisco, CA (US); Zeyu Jin, San Francisco, CA (US); Nicholas Bryan, Belmont, CA (US); Bryan A. Pardo, Evanston, IL (US)

(73) Assignees: Adobe Inc., San Jose, CA (US); Northwestern University, Evanston, IL (US)

( * ) Notice: Subject to any disclaimer, the term of this patent is extended or adjusted under 35 U.S.C. 154(b) by 21 days.

(21) Appl. No.: 17/558,580

(22) Filed: Dec. 21, 2021

(65) Prior Publication Data

US 2023/0197093 A1 Jun. 22, 2023

(51) Int. Cl.
*G10L 21/013* (2013.01)
*G10L 15/02* (2006.01)
(Continued)

(52) U.S. Cl.
CPC .......... *G10L 21/013* (2013.01); *G10L 15/02* (2013.01); *G10L 15/063* (2013.01);
(Continued)

(58) Field of Classification Search
CPC ................ G10L 21/013; G10L 2021/0135
See application file for complete search history.

(56) References Cited

U.S. PATENT DOCUMENTS 8,103,505 B1 * 1/2012 Silverman ............. G10L 13/033
704/260
2008/0109225 A1 * 5/2008 Sato ..................... G10L 13/06
704/E13.011
(Continued)

OTHER PUBLICATIONS

Vuppala, A. K., Limmayya, J., & Raghavendra, G. (2013). Neutral speech to anger speech conversion using prosody modification. In Mining Intelligence and Knowledge Exploration: First International Conference, MIKE 2013, Tamil Nadu, India, Dec. 18-20, 2013. Proceedings (pp. 383-390). Springer International Publi.*
(Continued)

*Primary Examiner* — Bryan S Blankenagel
(74) *Attorney, Agent, or Firm* — Kilpatrick Townsend & Stockton LLP

(57) ABSTRACT

Methods for modifying audio data include operations for accessing audio data having a first prosody, receiving a target prosody differing from the first prosody, and computing acoustic features representing samples. Computing respective acoustic features for a sample includes computing a pitch feature as a quantized pitch value of the sample by assigning a pitch value, of the target prosody or the audio data, to at least one of a set of pitch bins having equal widths in cents. Computing the respective acoustic features further includes computing a periodicity feature from the audio data. The respective acoustic features for the sample include the pitch feature, the periodicity feature, and other acoustic features. A neural vocoder is applied to the acoustic features to pitch-shift and time-stretch the audio data from the first prosody toward the target prosody.

20 Claims, 9 Drawing Sheets

(51) Int. Cl.
| | |
|---|---|
| *G10L 15/18* | (2013.01) |
| *G10L 25/90* | (2013.01) |
| *G10L 25/30* | (2013.01) |
| *G10L 19/032* | (2013.01) |
| *G10L 21/04* | (2013.01) |
| *G10L 25/24* | (2013.01) |
| *G10L 15/06* | (2013.01) |
| *G10L 19/028* | (2013.01) |

(52) U.S. Cl.
CPC ........ *G10L 15/1807* (2013.01); *G10L 19/028* (2013.01); *G10L 19/032* (2013.01); *G10L 21/04* (2013.01); *G10L 25/24* (2013.01); *G10L 25/30* (2013.01); *G10L 25/90* (2013.01); *G10L 2021/0135* (2013.01)

(56) References Cited

U.S. PATENT DOCUMENTS

| | | | | |
|---|---|---|---|---|
| 2008/0126093 | A1* | 5/2008 | Sivadas | G10L 15/187 704/E15.02 |
| 2008/0183473 | A1* | 7/2008 | Nagano | G10L 13/07 704/E13.011 |
| 2009/0316915 | A1* | 12/2009 | Streich | G10H 1/383 381/56 |
| 2016/0140953 | A1* | 5/2016 | Kwon | G10L 13/10 704/260 |
| 2018/0174570 | A1* | 6/2018 | Tamura | G10L 15/148 |
| 2021/0350795 | A1* | 11/2021 | Kenter | G06N 3/045 |
| 2022/0165250 | A1* | 5/2022 | Kang | G10L 25/45 |
| 2023/0113950 | A1* | 4/2023 | Shih | G10L 13/02 704/260 |

OTHER PUBLICATIONS

Budsabathon, C., & Nishihara, A. (2006). Dithered subband coding with spectral subtraction. IEICE transactions on fundamentals of electronics, communications and computer sciences, 89(6), 1788-1793.*

Mousa, A. (2010). Voice conversion using pitch shifting algorithm by time stretching with PSOLA and re-sampling. Journal of electrical engineering, 61(1), 57.*

Algorithms to Measure Audio Programme Loudness and True-Peak Audio Level, International Telecommunications Union, BS.1770-4, Oct. 2015, 25 pages.

Banno et al., Implementation of Realtime Straight Speech Manipulation System: Report on Its First Implementation, Acoustical Science and Technology, vol. 28, No. 3, May 2007, pp. 140-146.

Bechtold, A Simple Limiter in Python, Available online at: https://gist.github.com/bastibe/747283c55aad66404046, Accessed from Internet on Dec. 6, 2021, 3 pages.

Cheveigne et al., Yin, A Fundamental Frequency Estimator for Speech and Music, The Journal of the Acoustical Society of America, vol. 111, No. 4, Apr. 2002, pp. 1917-1930.

Forney, The Viterbi Algorithm, Proceedings of the Institute of Electrical and Electronics Engineers, vol. 61, No. 3, Mar. 1973, pp. 268-278.

Hsu, PyWORLD—A Python Wrapper of World Vocoder, Available online at: https://github.com/JeremyCCHsu/Python-Wrapper-for-World-Vocoder, Accessed from Internet on Dec. 6, 2021, 5 pages.

Kim et al., CREPE: A Convolutional Representation for Pitch Estimation, Institute of Electrical and Electronics Engineers International Conference on Acoustics, Speech and Signal Processing, Apr. 2018, pp. 161-165.

Kons et al., High Quality, Lightweight and Adaptable TTS Using LPCNet, Available online at: https://arxiv.org/ftp/arxiv/papers/1905/1905.00590.pdf, May 2, 2019, 5 pages.

Livingstone et al., The Ryerson Audio-Visual Database of Emotional Speech and Song (RAVDESS): A Dynamic, Multimodal Set of Facial and Vocal Expressions in North American English, PloS one, vol. 13, No. 5, May 16, 2018, pp. 1-35.

Makhoul, Linear Prediction: A Tutorial Review, Proceedings of the Institute of Electrical and Electronics Engineers, vol. 63, No. 4, Apr. 1975, pp. 561-580.

Mccurdy, Tentative Standards for Sound Level Meters, Electrical Engineering, vol. 55, No. 3, Mar. 1936, pp. 260-263, Abstract pp. 1-2.

Morise et al., Sound Quality Comparison Among High-Quality Vocoders by Using Re-Synthesized Speech, Acoustical Science and Technology, vol. 39. No. 3, Jan. 2018, pp. 263-265.

Morise et al., World: A Vocoder-Based High-Quality Speech Synthesis System for Real-Time Applications, Institute of Electronics, Information and Communication Engineers, Transactions on Information and Systems, Jul. 2016, pp. 1877-1884.

Morrison et al., Controllable Neural Prosody Synthesis, Interspeech, Aug. 11, 2020, 5 pages.

Morrison, Time-Domain Pitch-Synchronous Overlap-Add (TD-PSOLA), Available online at: https://github.com/maxrmorrison/psola, Accessed from Internet on Dec. 6, 2021, 6 pages.

Morrison, Torchcrepe, GitHub, Available Online at: https://github.com/maxrmorrison/torchcrepe, Accessed from Internet on Dec. 6, 2021, 6 pages.

Moulines et al., Pitch-Synchronous Waveform Processing Techniques for Text-to-Speech Synthesis Using Diphones, Speech Communication, vol. 9, Dec. 1990, pp. 453-467.

Mysore, Can We Automatically Transform Speech Recorded on Common Consumer Devices in Real-World Environments into Professional Production Quality Speech? A Dataset, Insights, and Challenges, IEEE Signal Processing Letter, vol. 22, No. 8, Dec. 10, 2014, pp. 1-5.

Prenger et al., Waveglow: A Flow-Based Generative Network for Speech Synthesis, Institute of Electrical and Electronics Engineers, International Conference on Acoustics, Speech and Signal Processing, May 2019, pp. 3617-3621.

Quatieri, Discrete-Time Speech Signal Processing: Principles and Practice, Oct. 2001, pp. 1-801.

Reddi et al., On the Convergence of Adam and Beyond, Available online at: https://arxiv.org/pdf/1904.09237.pdf, Apr. 19, 2019, pp. 1-23.

Rietveld et al., On the Relation Between Pitch Excursion Size and Prominence, Journal of Phonetics, vol. 13, No. 3, Jan. 1985, pp. 299-308.

Su et al., HiFi-GAN: High-Fidelity Denoising and Dereverberation Based on Speech Deep Features in Adversarial Networks, Interspeech, Available Online at: https://arxiv.org/pdf/2006.05694.pdf, Sep. 21, 2020, 5 pages.

Valina, Hybrid DSP/Deep Learning Approach to Real-Time Full-Band Speech Enhancement, Available online at: https://arxiv.org/pdf/1709.08243.pdf, May 31, 2018, 5 pages.

Valin et al., LPCNet, Available online at: https://github.com/mozilla/LPCNet, Accessed from Internet on Dec. 6, 2021, 5 pages.

Valin, LPCNet: DSP-Boosted Neural Speech Synthesis, Available online at: https://jmvalin.ca/demo/lpcnet/, Accessed from Internet on Dec. 6, 2021, 8 pages.

Valin et al., LPCNet: Improving Neural Speech Synthesis Through Linear Prediction, Institute of Electrical and Electronics Engineers, International Conference on Acoustics, Speech and Signal Processing (ICASSP)., Feb. 19, 2019, 5 pages.

Vanderkooy et al., Dither in Digital Audio, Journal of the Audio Engineering Society, vol. 35, No. 12, Dec. 1, 1987, pp. 966-975.

Wang et al., Neural Source-Filter-Based Waveform Model for Statistical Parametric Speech Synthesis, Institute of Electrical and Electronics Engineers, International Conference on Acoustics, Speech and Signal Processing (ICASSP)., Apr. 27, 2019, 11 pages.

Webber et al., Hider-Finder-Combiner: An Adversarial Architecture for General Speech Signal Modification, Interspeech, Available online at: https://www.isca speech.org/archive_v0/Interspeech_2020/pdfs/2558.pdf, Oct. 25-29, 2020, pp. 3206-3210.

Wu et al., Quasi-Periodic Parallel Wavegan: A Non-Autoregressive Raw Waveform Generative Model with Pitchdependent Dilated Convolution Neural Network, Institute of Electrical and Electronics

(56) References Cited

OTHER PUBLICATIONS

Engineers/Association for Computing Machinery Transactions on Audio, Speech, and Language Processing, vol. 29, Feb. 19, 2021, pp. 792-806.

Yamagishi et al., CSTR VCTK Corpus: English Multi-Speaker Corpus for CSTR Voice Cloning Toolkit (Version 0.92), Computer Science, Nov. 13, 2019, pp. 1-3.

Yamamoto et al., Parallel Wavegan: A Fast Waveform Generation Model Based on Generative Adversarial Networks with Multi-resolution Spectrogram, Institute of Electrical and Electronics Engineers, International Conference on Acoustics, Speech and Signal Processing (ICASSP), Feb. 6, 2020, 5 pages.

Yoneyama et al., Unified Source-filter GAN: Unified Source-Filter Network Based on Factorization of Quasi-Periodic Parallel WaveGAN, Available online at: https://arxiv.org/pdf/2104.04668.pdf, Jun. 2021, 5 pages.

\* cited by examiner

NEURAL PITCH-SHIFTING AND TIME-STRETCHING

TECHNICAL FIELD

This disclosure generally relates to audio enhancement and, more specifically, to an improved technique for a neural vocoder configured to perform pitch-shifting and time-stretching on audio data.

BACKGROUND

Speech manipulation techniques that modify the frequency and duration of speech (i.e., the pitch and rhythm) are essential for a variety of speech editing applications. These applications include audio-visual synchronization, prosody editing, auto-tuning, voice conversion, and synthesis (i.e., text to speech). The current techniques for pitch-shifting and time-stretching to modify pitch and rhythm use either digital signal processing (DSP) or deep learning, with the DSP-based techniques being favored due to efficiency and higher quality results. However, existing DSP-based methods for pitch-shifting and time-stretching induce artifacts, such as noise and reverberation, which degrade audio quality. These techniques can alter the timbre of speech to sound unnatural.

Neural vocoders are deep neural networks that convert acoustic features to a waveform. To use a neural vocoder for speech manipulation, a user or system might encode speech audio as acoustic features, modify these acoustic features, and then perform vocoding to produce a new waveform. Of the existing neural vocoders, only LPCNet seeks to address both pitch-shifting and time-stretching. However, while LPCNet has been informally shown to perform effective time-stretching, experimentation shows that LPCNet does not perform accurate pitch-shifting.

SUMMARY

In some embodiments, one or more processing devices perform operations to implement or use a vocoder system including a neural vocoder. The vocoder system is configured to apply a target prosody to audio data, where the target prosody indicates phoneme durations, a pitch contour, or a combination of both. In some examples, the target prosody has been determined based on a larger context of audio data around and including the audio data to which the target prosody is to be applied, so as to correct the prosody of the audio data.

An example of the vocoder system applies the target prosody to the audio data. The vocoder system extracts acoustic features from the target prosody and the audio data. To this end, the vocoder system computes acoustic features representing samples of the target prosody and the audio data, where respective acoustic features for each sample include a pitch feature and a periodicity feature representing the target prosody as well as cepstral coefficients representing the audio data. The vocoder system then inputs the acoustic features of the samples into the neural vocoder, which generates a probability distribution of possible excitation values for each sample and determines a synthesized output sample by sampling the probability distribution using a constant sampling temperature. The synthesized output values together form an updated version of the audio data. In this manner, the neural vocoder performs pitch-shifting and time-stretching to modify the audio data toward the target prosody, thus mapping the acoustic features to an updated version of the audio data whose pitch and rhythm now match or at least more closely match the target prosody.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
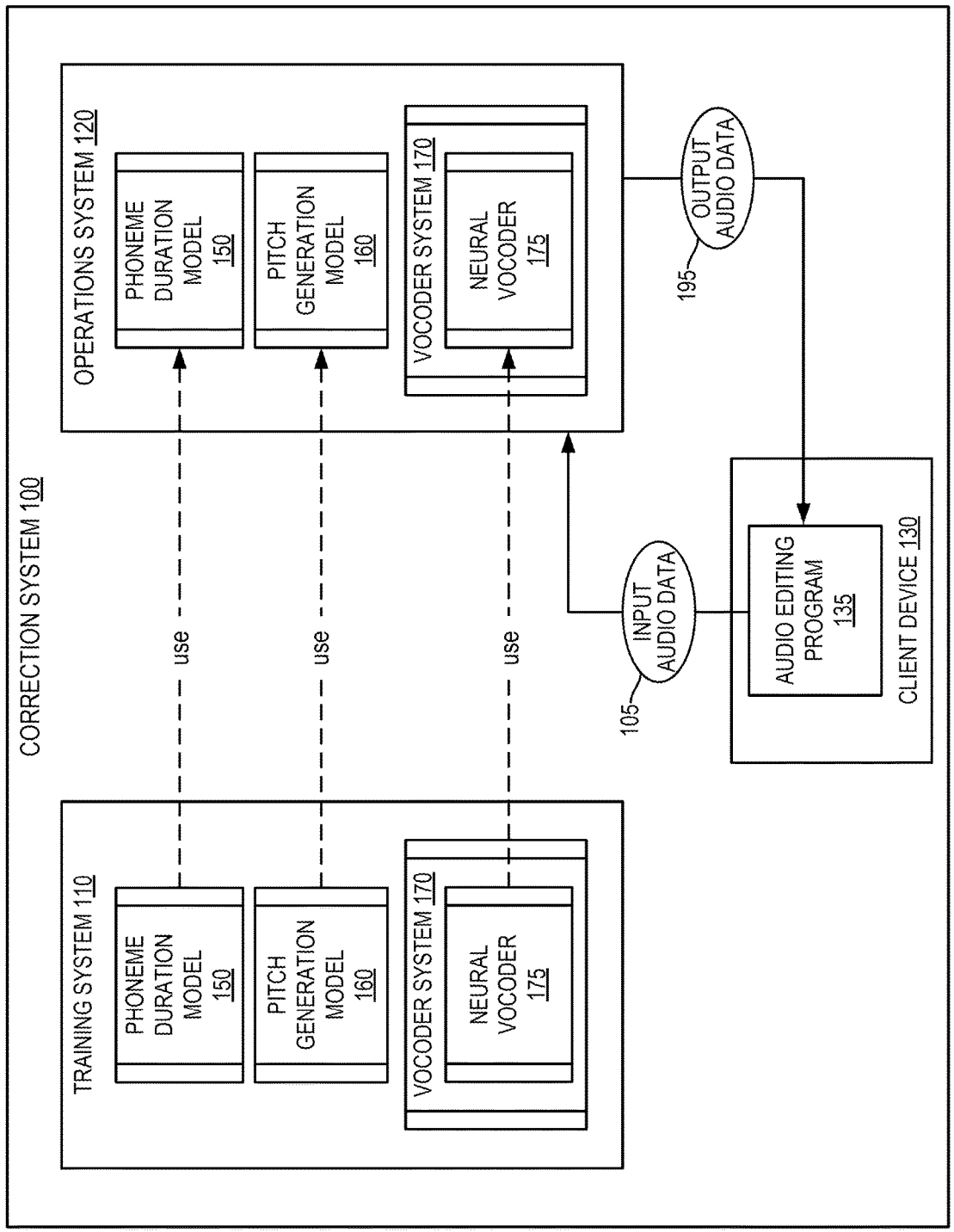
FIG. 1 is a diagram of an example a vocoder system incorporated into a correction system for correcting prosody of subject audio data in an edit region of an audio recording, according to some embodiments described herein.

Existing vocoders come with various drawbacks. Techniques for pitch-shifting and time-stretching that are based in digital signal processing (DSP) tend to create undesirable artifacts. Existing techniques that involve neural vocoders introduce significant artifacts, such as noise and reverberation, or such techniques are not effective in both pitch-shifting and time-stretching. Embodiments described herein represent an improvement over such systems through the use of a novel neural vocoder, which can be used to correct prosody (i.e., the pitch or rhythm of speech) or can perform various other audio enhancement tasks.

Some embodiments of a neural vocoder described herein are incorporated into a correction system for correcting the prosody of subject audio data. In that case, the correction system extracts acoustic features from the target prosody and the subject audio data, including utilizing a prediction model to predict some of those acoustic features. The neural vocoder takes the acoustic features as input and performs pitch-shifting and time-stretching on the subject audio data to modify the subject audio data toward the target prosody. The neural vocoder thus generates and outputs an updated version of the subject audio data having the target prosody, thereby enabling the subject audio data to be combined with unedited audio data with prosodic continuity.

The following non-limiting example is provided to introduce certain embodiments. In this example, a neural vocoder is incorporated into a correction system for correcting prosody in subject audio data. The correction system accesses (e.g., receives) input audio data. The input audio data comprises an audio recording that includes both unedited audio data in an unedited audio portion and subject audio data in an audio edit region of the audio recording. For instance, the audio edit region may be positioned on either end of the unedited audio portion or between sub-portions of the unedited audio portion. In some cases, the subject audio data in the edit region was specified or modified using text-based speech editing, and thus, a transcript of the unedited audio portion and the audio edit region are available. Additionally or alternatively, however, some other editing technique was used, and in that case, a speech-to-text technique may be used to provide a transcript of the audio edit region and the unedited audio portion.

In this example, the correction system predicts a duration of each phoneme in the subject audio data in the edit region, where the predicted duration is a prediction of the time to speak the phoneme based on the phoneme durations in the unedited audio data of the unedited audio portion. To this end, the correction system utilizes a machine learning (ML) model referred to herein as a phoneme duration model. The phoneme duration model is, for example, a neural network such as a sequence-to-sequence model. The correction system applies the phoneme duration model to the sequence of phonemes in the input audio data, including the subject audio data and the unedited audio data, as identified in the transcript. The phoneme duration model thus predicts and outputs a respective duration for each phoneme in the subject audio data.

Given the duration of each phoneme in the unedited audio data in the unedited audio portion and as predicted for the subject audio data in the audio edit region, the correction system may use a second ML model, referred to herein as a pitch generation model, to predict a pitch contour for the subject audio data. More specifically, in this example, the correction system applies the pitch generation model to each frame of speech of a predetermined length (e.g., ten milliseconds) given the phoneme durations. The pitch generation model thus predicts and outputs a respective pitch for each frame of the audio edit region. Together, the duration and pitch of the subject audio data, as predicted by the phoneme duration model and the pitch generation model, form a target prosody for the subject audio data.

In this example, the correction system applies the target prosody to the subject audio data. To this end, the correction system extracts acoustic features from the target prosody and the subject audio data and then utilizes the neural vocoder to map the acoustic features to an updated version of the subject audio data, whose pitch and rhythm now matches or at least more closely matches the target prosody. The neural vocoder takes as input acoustic features of the subject audio data and the target prosody and performs pitch-shifting and time-stretching to modify the subject audio data toward the target prosody. The neural vocoder thus generates and outputs a version of the subject audio data having prosodic continuity with the unedited portion of the audio recording. Thus, when the subject audio data is combined with the unedited audio data, the prosody across the cut points of that combination has a natural sound.

Certain embodiments described herein represent improvements in the technical field of audio enhancement. Specifically, some embodiments utilize novel techniques of predicting phoneme duration and pitch contour so as to predict a target prosody for subject audio data in an audio edit region. These novel techniques determine high-level control parameters describing how to transform audio data. Further, a neural vocoder described herein uses a novel pitch representation that enables modeling low- and high-pitched voices more effectively than done with existing neural vocoder techniques. The neural vocoder described herein also benefits from a novel training process that augments a dataset in a manner that shifts pitch to introduce a broader range of pitches during training and, further, to enable the neural vocoder to more effectively learn to isolate and react to pitch features of audio data. Additionally, as compared to existing vocoders, the neural vocoder described herein exhibits better controllability in terms of achieving a desired set of frequencies, phoneme durations, or a combination of both. In short, embodiments described herein can more effectively map audio data to modified audio data with a desired rhythm, pitch contour, or both.

As used herein, the term "audio" is used generally to refer to an audio recording or to an audio track of an audio-visual recording, and "audio data" refers to the data that comprises the audio. Although some embodiments described herein are particularly suited to speech audio and speech audio data, in other embodiments, the audio could fall into other categories. For instance, the audio data could be an encoding of rapping or of singing within a flattened range.

As used herein, the term "audio edit region," also referred to as an "edit region," means a region of an audio recording that has been or is to be edited, possibly including a portion of audio that has not been edited but is adjacent to an edited portion and being treated as a common region. "Subject audio data" refers to the audio data in the edit region. Because the edit region may include both edited audio data as well as unedited audio data, the subject audio data may include just edited audio data or a combination of both edited and unedited audio data.

As used herein, the term "unedited audio portion" means a portion of an audio recording outside of an edit region of the audio recording. In some examples, an unedited audio portion includes a combination of audio adjacent to the edit region on one side of the edit region and additional audio adjacent to the edit region on the other side of the edit region. "Unedited audio data" refers to original or unedited audio data in an unedited audio portion.

As used herein the term "phoneme" refers to a fundamental unit of sound that can be combined with other fundamental units of sound to form words in a particular language. For instance, there may be one or multiple phonemes in a syllable. As used herein, the term "prosody" refers to pitch (i.e., frequency) or phoneme duration (i.e. rhythm), or a combination of pitch and phoneme duration.

Example Use of a Neural Vocoder in a Correction System

Referring now to the drawings, FIG. 1 is a diagram of an example of a vocoder system 101 incorporated into a correction system 100 for correcting prosody in subject audio data, according to some embodiments described herein. As shown in FIG. 1, some examples of the correction system 100 include one or both of a training system 110 and an operations system 120. In general, the training system 110 performs initialization tasks such as training ML models used by the operations system 120, and the operations system 120 operates on audio data to determine and apply a target prosody. In some embodiments, the training system 110 performs a set of operations once for initialization or as needed to update the ML models, and the operations system 120 performs a set of operations on input audio data 105 each time it is desired to correct the prosody of subject audio data in an edit region.

In some embodiments, the operations system 120 receives a request to correct the prosody of subject audio data in an edit region of the input audio data in an audio recording. The edit region is located at a specific position, or index, of the input audio data. Thus, the subject audio data differs from audio data that was originally recorded or previously existed at the index of the audio edit region. In some embodiments, a client device 130 makes the request to the operations system 120. The client device 130 may be a separate device from the operations system 120, or alternatively, the operations system 120 is integrated with the client device 130 in whole or in part. For instance, the operations system 120 may run as an application on the client device 130. To initiate the request for prosody correction, a user could edit audio data at the client device 130 using an audio editing program 135, which may implement a text-based speech editing technique or other form of audio editing. Through such editing, the client device 130 generates the subject audio data. The client device 130 then communicates the subject audio recording, or at least the subject audio data, to the operations system 120 as input audio data 105 along with a request to correct the prosody of the subject audio data in the context of the input audio data 105 and, more specifically, in the context of the unedited audio data in the unedited audio portion of the audio recording.

The operations system 120 may include, or may otherwise access, one or more of the following, which act as subsystems of the operations system 120: a phoneme duration model 150, a pitch generation model 160, and a vocoder system 170. In response to the request received by the operations system 120, an example of the phoneme duration model 150 determines (e.g., predicts), based on the context of the unedited audio portion, a respective duration (e.g., in seconds) for each phoneme in the subject audio data of the edit region. Given the phonemes of the subject audio data and their associated durations as predicted by the phoneme duration model 150, and further based on the context of the unedited audio portion, an example of the pitch generation model 160 determines (e.g., predicts) a respective pitch for each audio frame of the edit region. Together, the predicted phoneme durations and pitch contour of the subject audio data form a target prosody for the subject audio data, and an example of the vocoder system 170 encodes the subject audio data and the target prosody into acoustic features and then utilizes a neural vocoder 175 to map those acoustic features to an updated version of the subject audio data. The version of the subject audio data output by the neural vocoder 175 has a prosody matching, or close to, the target prosody. These operations will be described in more detail below.

The operations system 120 may output the subject audio data, as modified, as output audio data 195 to enable the client device 130 to combine that output with the unedited audio portion of the audio recording. Additionally or alternatively, the operations system 120 may provide output audio data 195 that includes the subject audio data, as modified, along with the unedited audio data.

In some embodiments, prior to initial operation of the operations system 120, the training system 110 trains one or more of the following ML models, also referred to herein as models: the phoneme duration model 150, the pitch generation model 160, and the neural vocoder 175. In some examples, the training system 110 trains each of the phoneme duration model 150, the pitch generation model 160, and the neural vocoder 175 individually. Additionally or alternatively, in some examples, one or more of these ML models may be trained outside of the correction system 100 rather than being trained by the training system 110 as shown in FIG. 1. After training, each of the phoneme duration model 150, the pitch generation model 160, and the neural vocoder 175 are accessible to the operations system 120 to enable the operations system 120 to use these models to correct prosody as described herein.

In some embodiments, the phoneme duration model 150 is an ML model such as a neural network. During operation, the phoneme duration model 150 inputs phonemes that have been extracted from the subject audio data and, in some examples, one-hot encoded. The phoneme duration model outputs, for each phoneme, a duration based on the context of the unedited audio portion. The duration may be output in terms of seconds and may be upper-bounded (e.g., at half a second) to prevent long silences in the final edit region.

An example of the phoneme duration model 150 is implemented as a sequence-to-sequence model including an encoder and decoder. For example, the encoder is or includes two one-dimensional (1D) convolution blocks followed by a bidirectional gated recurrent unit (GRU). Each convolution block includes of a convolution with 512 channels and a kernel size of 5, rectified linear (ReLU) activation, and batch normalization. For example, the decoder is or includes a unidirectional GRU with 256 channels followed by a linear layer.

During training, an example of the phoneme duration model 150 learns to minimize the mean-squared error between real-valued phoneme durations predicted and ground truth durations extracted with, for instance, the Penn Phonetic Forced Aligner. In some embodiments, the training system 110 trains the phoneme duration model 150 in a single-speaker fashion on each dataset. For this purpose, a dataset may include two hours of speech for training and two hours for validation. The training system 110 trains the phoneme duration model 150 for thirty epochs with a batch size of sixty-four. Further, during training, an embodiment of the training system 110 randomly provides short sequences of ground truth phoneme durations as input features. To this end, the training system 110 randomly selects half of the training samples in each batch to have k adjacent ground truth durations, where k Uniform(0, 24), so that the model learns to fill in remaining durations in a context-aware manner.

In some embodiments, the pitch generation model 160 is an ML model such as a neural network and, more specifically, such as a sequence-to-sequence model. The pitch generation model 160 may receive as input a sequence of phonemes divided into audio frames based on their respective durations, as determined by the phoneme duration model 150. Each audio frame may have the same time length, such as ten milliseconds, and the pitch generation model 160 generates a pitch, also referred to as a pitch value, for each such audio frame based on the context of the audio portion.

In some embodiments, during training, the pitch generation model learns to predict respective pitches of audio frames, given a sequence of phonemes associated with respective durations. Ground truth pitch values for use in training may be extracted using, for example, a PyTorch port of the Crepe pitch tracker. To reduce double- and half-frequency errors, some embodiments of the training system 110 decode the pitch from a sequence of categorical distributions, such as those predicted by Crepe using Viterbi decoding. The training system 110 extracts and identifies voiced and unvoiced tokens by performing hysteresis thresholding on Crepe's network confidence value.

An example of the pitch generation model 160 is or includes the Controllable DAR (C-DAR) model for pitch generation. C-DAR generates a pitch value for each ten-millisecond frame of speech from one-hot encoded phonemes and linguistic features that have been upsampled according to input phoneme durations. C-DAR predicts a categorical distribution over a discrete set possible pitch values, such as 128 possible pitch values that are evenly distributed between −4 and +4 standard deviations from a speaker's average pitch in base-2 log scale.

Example of a Neural Vocoder

As mentioned above, the vocoder system 170 may apply the target prosody, as determined by the phoneme duration model 150 and the pitch generation model 160, to the subject audio data in the edit region. However, embodiments of a neural vocoder 175 described herein are not limited to the context of a correction system 100 for correcting prosody. Rather, the vocoder system 170 and the neural vocoder 175 can be used in various speech-editing applications or various situations where a vocoder or a synthesizer might be used. For instance, the vocoder system 170 or the neural vocoder 175, or both, may be used for audio-visual synchronization, auto-tuning, or voice conversion. Various applications are possible and are within the scope of this disclosure.

Figure 2:
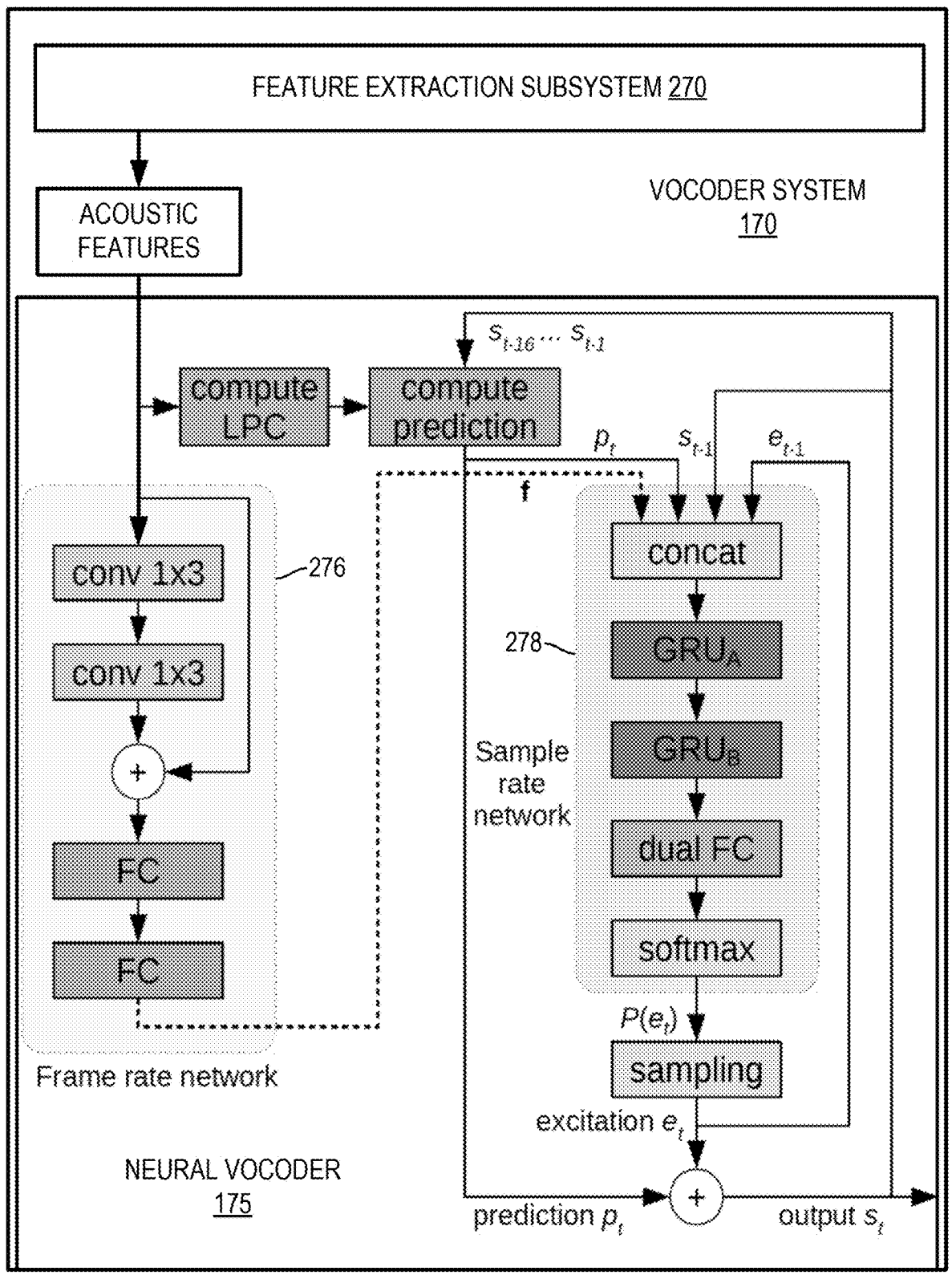
FIG. 2 is a diagram of an example of a vocoder system useable in the correction system or in other applications, according to some embodiments described herein.

FIG. 2 is a diagram of an example of a vocoder system 170 useable in the correction system 100 or in other applications, according to some embodiments described herein. As shown in FIG. 2, in some embodiments, the vocoder system 170 extracts acoustic features from audio data and from a target prosody so that those acoustic features can be operated on by the neural vocoder 175 of the vocoder system 170. An embodiment of the neural vocoder 175 described herein imposes an envelope of a modulator signal (i.e., the target prosody) onto the waveform of audio data, which acts as a carrier signal. The neural vocoder 175 outputs an updated version of that audio data having frequency and amplitude of the modulator signal but with the timbre of the carrier signal. In some embodiments, in the context of the correction system 100, the neural vocoder 175 inputs acoustic features representing a target prosody and subject audio data from an edit region of an audio recording, and the neural vocoder 175 generates and outputs a version of the subject audio data that matches, or is close to, the target prosody determined from the context of the unedited audio portion of the input audio data 105. In other applications, however, the audio data operated on by the neural vocoder 175 need not have been edited already to be operated on the vocoder system 170 or the neural vocoder 175.

As shown in FIG. 2, in some embodiments, the vocoder system 170 includes a feature extraction subsystem 270 and the neural vocoder 175. In some embodiments, the neural vocoder 175 has similarities to LPCNet, which utilizes linear predictive coding (LPC). As mentioned above, LPCNet is not sufficiently effective at pitch-shifting. This is likely because of limitations in the pitch representation used in LPCNet; insufficient disentanglement between pitch and acoustic features, which can result in a failure to effectively train LPCNet to respond to pitch; and a lack of training data for particularly high- and low-pitched speech. Similar to LPCNet, an example of the neural vocoder 175 includes a frame-rate network 276 and a sample-rate network 278 as subnetworks. However, an embodiment of the neural vocoder 175 described herein addresses the issues inherent in LPCNet. Specifically, for instance, the neural vocoder 175 is trained differently than is LPCNet, operates on different acoustic features than does LPCNet, and performs a different process of sampling excitation values generated by the sample-rate network 278. These distinctions will be described in more detail below.

In some embodiments, the neural vocoder 175 models samples of a speech signal (i.e., audio data). Generally, a sample is a small unit of audio data (e.g., the smallest unit into which audio data can be divided), and there may be multiple samples per audio frame. Each sample is modeled as the sum of a deterministic term, also referred to herein as the prediction value, and a stochastic term, also referred to herein as the excitation value. As shown in FIG. 2, the neural vocoder 175 may compute a prediction value through linear predictive coding, where the LPC coefficients are derived from cepstral coefficients, specifically, for instance, Bark-frequency cepstral coefficients (BFCCs).

As shown in FIG. 2, in some embodiments, the frame-rate network 276 includes two one-dimensional (1D) convolution layers with tanh activations and two dense fully connected (FC) layers with tanh activations. As part of the frame-rate network 276, acoustic features first go through the two 1D convolution layers with a filter size of 3, thus labeled 1×3 in FIG. 2. This results in a receptive field of five frames, including two frames ahead and two frames behind a current frame. In some examples, the neural vocoder 175 inputs twenty acoustic features, including a pitch feature, a periodicity feature, and eighteen cepstral coefficients, such as BFCCs. The output of the two convolution layers is added to a residual connection and then goes through the two fully connected layers. The frame-rate network 276 outputs an embedding, which can be a 128-dimensional embedding representing the current audio frame. The embedding may be held constant for the duration of processing the current frame, which may include multiple samples.

In some embodiments, the sample-rate network 278 includes an embedding layer, labeled "concat" in FIG. 2, which combines (e.g., concatenates) its inputs. The sample-rate network 278 may take the following four inputs: the prior excitation value (i.e., from the last input sample); the prior synthesized output sample; a prediction value; and the embedding output by the frame-rate network 276, optionally after nearest neighbor upsampling. Following the embedding layer, the sample-rate network 278 includes two GRU layers and a dual fully connected layer. The output of the dual fully connected layer is used with a softmax activation to compute the probability $P(e_t)$ of each possible excitation value $e_t$ for the current sample. The sample-rate network 278 samples the probability distribution of $P(e_t)$ to determine and output an excitation value corresponding to the sample. The neural vocoder 175 outputs a synthesized output sample $s_t$, which is raw audio data and which is a combination of the excitation value and the prediction value.

As compared to LPCNet, an embodiment of the neural vocoder 175 described herein implements an improved process for sampling the probability distribution of $P(e_t)$ to determine the excitation value. The original LPCNet samples the probability distribution with sampling temperature dependent on the periodicity feature. In some embodiments, however, the neural vocoder 175 described herein uses a constant sampling temperature, such as a sampling temperature of 1, which performs equivalently to a variable sampling temperature when the amount of training data is sufficiently large. An embodiment of the neural vocoder 175 retains the thresholding of the excitation distribution at small values. For instance, if $p(e_t=c)$ for $c=1, \ldots, 256$ is a predicted 256-dimensional categorical distribution over mu-law-encoded excitation values, and if $P_{t,c}=\max[0, p(e_t=c)-T]$, where T is a constant threshold, the neural vocoder 175 samples excitation values from the categorical distribution $P_{t,c}/\Sigma_{i=1}^{256} P_{t,i}$. For example, the neural vocoder 175 uses T=0.001, which maximizes the F1 score of the voiced versus unvoiced decision.

Time resolutions of the frame-rate network 276 and the sample-rate network 278 are related by an upsampling factor k. For every frame processed by the frame-rate network 276, the sample-rate network 278 produces k samples without overlap between frames. An embodiment of the neural vocoder 175 can therefore perform time-stretching by using a variable-rate hop size $k_f$ on a per-frame basis. For example, if a phoneme is spoken for a hundred milliseconds and that amounts to ten frames, the neural vocoder 175 can stretch the phoneme to two hundred milliseconds by decoding twice as many samples from each frame.

Embodiments of the vocoder system 170 and the neural vocoder 175 can be used in various contexts not limited to the contexts described herein. Although this disclosure refers to a continuing example of the vocoder system 170 and the neural vocoder 175 being used as part of a correction system 100 for correcting prosody after an audio recording has been edited, this example does not limit the various embodiments of the vocoder system 170 or the neural vocoder 175 described herein. Rather, embodiments of the vocoder system 170 or the neural vocoder 175 can be used in various applications. Additional examples of applications of the vocoder system 170 and the neural vocoder 175 include speeding up video lectures; emphasis modification without speech-to-text conversion; pitch-shifting and time-stretching together with coding and transmission of speech with low bit rates; and shortening the duration of speech recording, such as to reduce regions of silence. Various applications and implementations of such applications are possible and are within the scope of this disclosure.

Example Process of Prosody Correction

Figure 3:
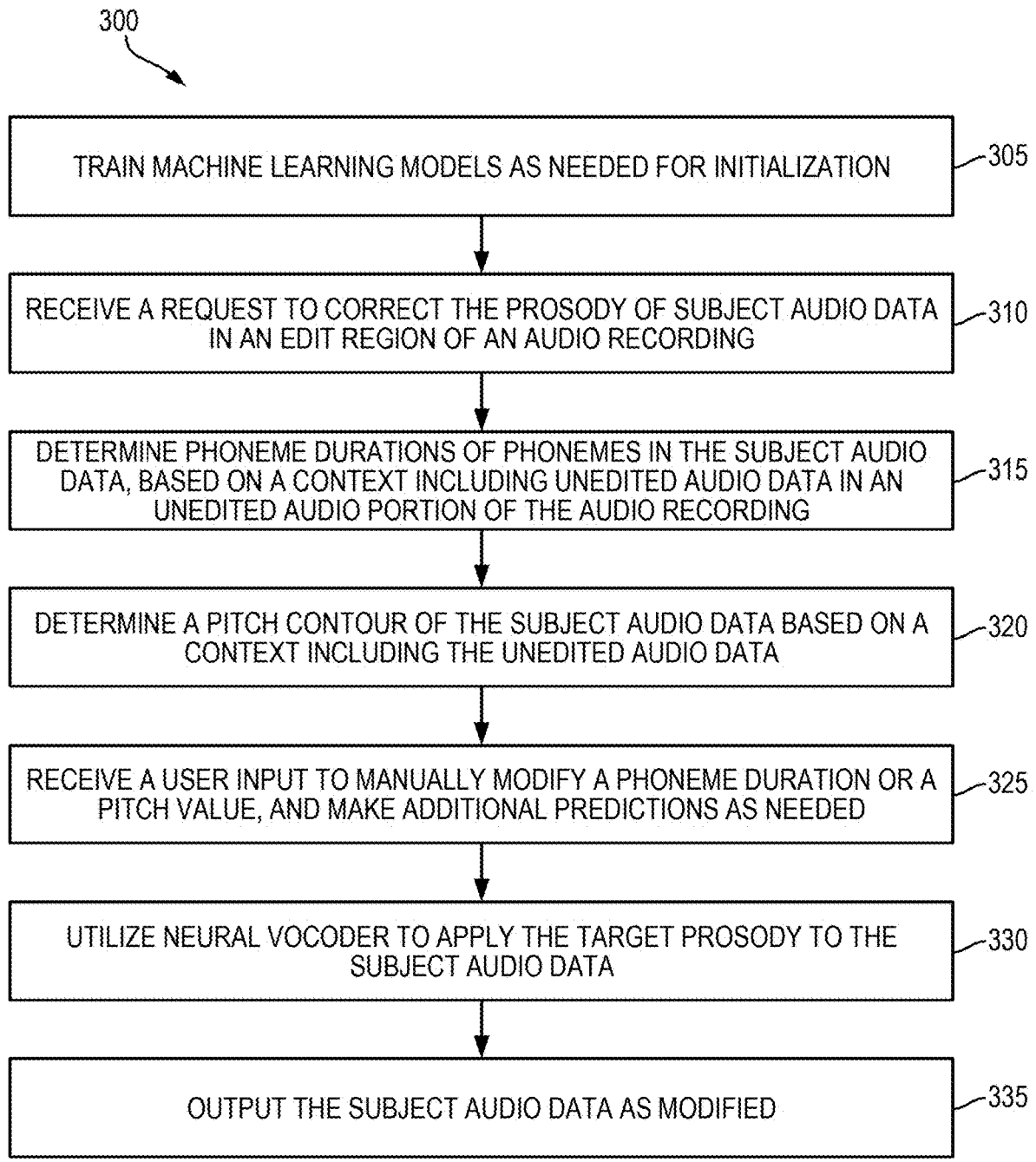
FIG. 3 is a diagram of an example of a process for correcting prosody of subject audio data in an edit region of an audio recording, according to some embodiments described herein.

FIG. 3 is a diagram of an example of a process 300 for correcting the prosody of subject audio data in an edit region of an audio recording, according to some embodiments described herein. As discussed above, neither the vocoder system 170 nor the neural vocoder 175 is limited to the application of prosody correction, but rather, this process 300 illustrates an example implementation. The process 300 depicted in FIG. 3 may be implemented in software executed by one or more processing units of a computing system, implemented in hardware, or implemented as a combination of software and hardware. This process 300 is intended to be illustrative and non-limiting. Although FIG. 3 depicts various processing operations occurring in a particular order, the particular order depicted is not required. In certain alternative embodiments, the processing may be performed in a different order, some operations may be performed in parallel, or operations may be added, removed, or combined together.

As shown in FIG. 3, at block 305, the process 300 involves training each ML model that requires training. The ML models can include one or more of the phoneme duration model 150, the pitch generation model 160, and the neural vocoder 170, and in some embodiments, the training system 110 trains each of such models that require training and does so prior to correcting the prosody of any subject audio data in an edit region. In some embodiments, one or more ML models of the correction system 100 are trained outside of the correction system 100 and thus need not be trained by the training system 110. This training need not be performed for each prosody correction needed but, rather, may be performed once as an initialization operation or as needed to refine the ML models.

At block 310, the process 300 involves receiving a request to correct the prosody of subject audio data in an edit region, where the request indicates an index in the audio recording indicating the position of the edit region. The operations system 110 may then access the subject audio data in the edit region and the unedited audio data in the unedited audio portion of the audio recording to perform the operations described below. In some embodiments, the subject audio data has already been inserted into the audio edit region, but this need not be the case. In either case, when inserted into the audio recording at the indicated index, the edit region along with the unedited audio portion form input audio data 105 to be operated on as described below.

At block 315, the process 300 involves determining phoneme durations including a respective phoneme duration for each phoneme in the subject audio data specified in the request received at block 310. In some embodiments, as described further below, the operations system 120 determines the phoneme durations by applying the phoneme duration model 150 to a sequence of phonemes extracted from the input audio data 105 (i.e., both the subject audio data and the unedited audio portion). The phoneme duration model 150 outputs the respective durations of each phoneme in the subject audio data. This operation will be described in more detail below, with reference to FIG. 4.

At block 320, the process 300 involves determining a pitch contour, including a respective pitch for each audio frame of the subject audio data. In some embodiments, as described further below, the operations system 120 determines the pitch contour by applying the pitch generation model 160 to audio frames of the input audio data 105, in which the subject audio data is now assumed to have the phoneme durations determined at block 315. Based on the pitches predicted for the various audio frames, the operations system 110 can assign a respective pitch value to each audio frame of the subject audio data. This operation will be described in more detail below, with reference to FIG. 5.

In this disclosure, prosody refers to a combination of pitch and phoneme duration. Thus, the phoneme durations determined at block 315 and the pitch contour determined at block 320 together form a target prosody for the subject audio data.

At block 325, the process 300 involves receiving a user input and modifying a phoneme duration or pitch value, as determined at block 315 or 320, based on the user input. For instance, the audio editing application 135 at the client device 130 may present the user with a user interface, through which the user may specify respective durations or pitch values of specific phonemes, such as by adjusting the phoneme durations or pitch values that were automatically determined as described above. In one example, the operations system 120 generates a variety of candidate phoneme durations or pitch values for a phoneme and allows the user to select one of such candidates for use. In some embodiments, if the user input specifies a phoneme duration for a phoneme of the subject audio data in the edit region, that phoneme duration replaces the predicted phoneme duration for the phoneme. Analogously, if the user input specifies a pitch value for a phoneme of the subject audio data, that pitch value replaces the predicted pitch value for the phoneme. Further, in some embodiments, if the user input specifies values for phoneme duration, pitch, or both for only a subset of the phonemes in the subject audio data, rather than for all phonemes in the subject audio data, then the operations system 120 may re-predict the phoneme durations and pitch values of the remaining phonemes of the subject audio data to ensure prosodic continuity.

In some embodiments, a user of the client device 130 is enabled to provide such a user input before the predictions of phoneme durations and pitch contour are performed at block 315 and 320. In that case, if a user input is received that indicates respective phoneme durations and pitch values for all phonemes of the subject audio data, then the operations system 120 may use the user input in place of performing the predictions of blocks 315 and 320. However, if the user input specifies values for phoneme duration, pitch, or both for only a subset of the phonemes in the subject audio data, the operations system 120 may predict the phoneme durations and pitch values of the remaining phonemes of the subject audio data to ensure prosodic continuity.

At block 330, the process 300 involves applying the target prosody to the subject audio data to match, or at least more closely match, the target prosody determined at blocks 315-325. To this end, in some embodiments, the vocoder system 170 of the operations system 120 extracts acoustic features of the subject audio data and the target prosody, as described in more detail below, and then utilizes the neural vocoder 175 to perform pitch-shifting and time-stretching, as is also described in more detail below. The vocoder system 170 outputs an audio signal (e.g., a waveform) that is a modified version of the subject audio data having been pitch-shifted and time-stretched by the neural vocoder 175.

At block 335, the operations system 120 outputs the subject audio data, which has been modified to correct its prosody as described above. In outputting the subject audio data, the operations system 120 may output audio data 195 that includes both the unedited audio data in the unedited audio portion and the subject audio data in edit region.

Example of Determining Phoneme Duration

Figure 4:
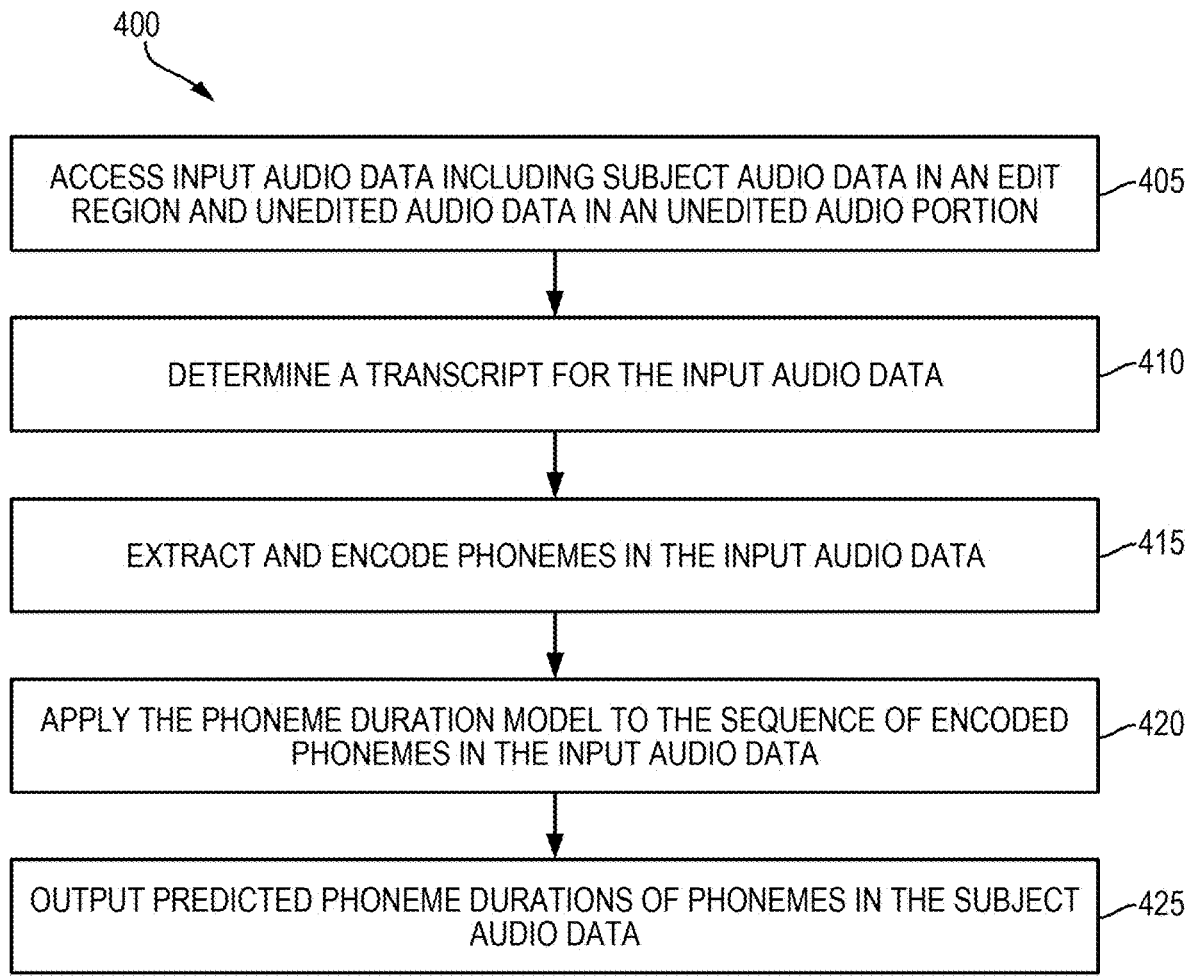
FIG. 4 is a diagram of an example of a process for determining phoneme durations of phonemes in subject audio data in an edit region of an audio recording, according to some embodiments described herein.

FIG. 4 is a diagram of an example of a process 400 for determining phoneme durations of phonemes in the subject audio data in the edit region, according to some embodiments described herein. In some embodiments, this process 400 is performed by the operations system 120 and involves the phoneme duration model 150. The operations system 120 can use this process 400 or similar to implement block 315 of the above process 300 illustrated in FIG. 3. The process 400 depicted in FIG. 4 may be implemented in software executed by one or more processing units of a computing system, implemented in hardware, or implemented as a combination of software and hardware. This process 400 is intended to be illustrative and non-limiting. Although FIG. 4 depicts various processing operations occurring in a particular order, the particular order depicted is not required. In certain alternative embodiments, the processing may be performed in a different order, some operations may be performed in parallel, or operations may be added, removed, or combined together.

As shown in FIG. 4, at block 405, the process 400 involves accessing input audio data 105 including an unedited audio portion and an edit region inserted at an index in the input audio data 105. As discussed above, the correction system 100 is configured to correct the prosody of subject audio data in the edit region based on the context of unedited audio data in the unedited audio portion.

At block 410, the process 400 involves determining a transcript for the input audio data 105. In some embodiments, the subject audio data was generated on the client device 130 through text-based speech editing, and in that case, a transcript is known at the client device 130 and could be provided as part of the request to correct the prosody. Additionally or alternatively, however, the operations system 120 may utilize a speech-to-text technique to determine the transcript.

At block 415, the process 400 involves extracting and encoding phonemes in the input audio data 105. Various techniques exist for extracting phonemes from a transcript of speech, and the operations system 120 may use one or more of such techniques. For instance, the operations system 120 may use a grapheme-to-phoneme conversion to convert the transcript determined at block 405 to a sequence of phonemes in the input audio data 105 and, more specifically, in the subject audio data in edit region and the unedited audio data in unedited audio portion. In some embodiments, encoding the phonemes converts each phoneme into a corresponding numerical representation that encodes, or represents, that phoneme. The operations system 120 may perform one-hot encoding of the phonemes based on linguistic features, but other encoding techniques may be used additionally or alternatively.

At block 420, the process 400 involves applying the phoneme duration model 150 to the sequence of encoded phonemes and their associated initial durations. In the case of the phonemes from the unedited audio data in the unedited audio portion, the actual durations of such phonemes may be input into the phoneme duration model 150. In the case of the phonemes from the subject audio data in the edit region, however, the durations may be masked, such as by being zeroed out. As discussed above, the phoneme duration model may be sequence-to-sequence model and thus may consider the context of each input within the sequence. In some embodiments, the phoneme duration model 150 outputs a sequence of predicted phoneme durations that correspond to the input encoded phonemes. An example of the operations system 120 discards the predicted phoneme durations output for phonemes in the unedited audio data, but keeps the predicted phoneme durations for phonemes of the subject audio data for use in the remainder of this process 400.

At block 425, the process 400 involves outputting the predicted phoneme durations of the phonemes in the subject audio data. These phonemes are thus incorporated in the target prosody for the subject audio data.

Example of Pitch Determination

Figure 5:
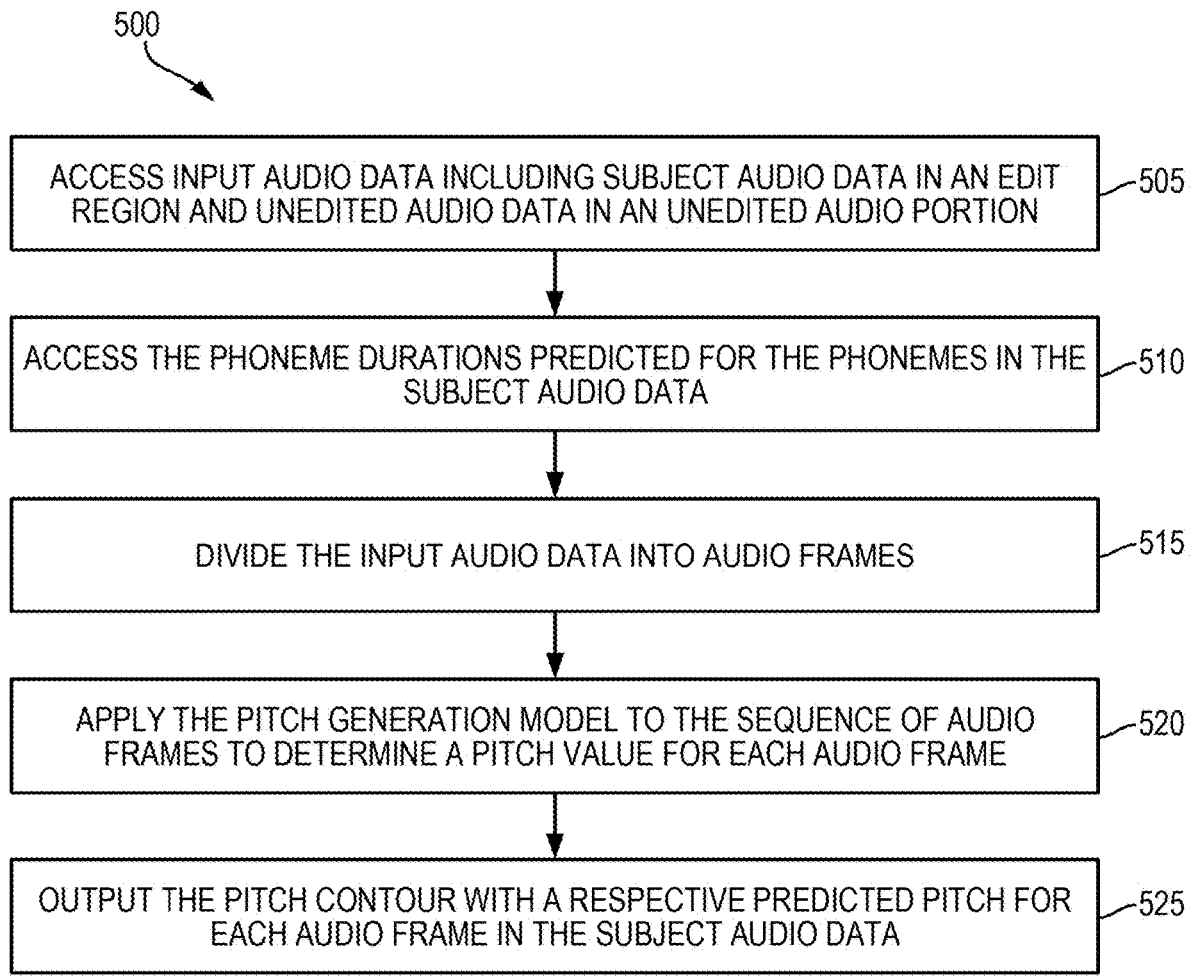
FIG. 5 is a diagram of an example of a process for determining a pitch contour for subject audio data in an edit region of an audio recording, according to some embodiments described herein.

FIG. 5 is a diagram of an example of a process 500 for determining a pitch contour for the subject audio data in the edit region, according to some embodiments described herein. In some embodiments, this process 500 is performed by the operations system 120 and involves the pitch generation model 160. The operations system 120 can use this process 500 or similar to implement block 320 of the above process 300 illustrated in FIG. 3. The process 500 depicted in FIG. 5 may be implemented in software executed by one or more processing units of a computing system, implemented in hardware, or implemented as a combination of software and hardware. This process 500 is intended to be illustrative and non-limiting. Although FIG. 5 depicts various processing operations occurring in a particular order, the particular order depicted is not required. In certain alternative embodiments, the processing may be performed in a different order, some operations may be performed in parallel, or operations may be added, removed, or combined together.

As shown in FIG. 5, at block 505, the process 500 involves accessing input audio data 105 including an unedited audio portion and an edit region inserted at an index in the input audio data 105. At block 510, the process 500 involves accessing the phoneme durations of each phoneme in the input audio data 105. The phoneme durations include the original phoneme durations from the unedited audio data in the unedited audio portion and the predicted phoneme durations for the subject audio data in the edit region.

At block 515, the process 500 involves dividing the input audio data 105 into intervals, referred to herein as frames or audio frames. In some examples, the audio frames are equal length, and for instance, each audio frame has a duration of ten milliseconds. However, various implementations are within the scope of this disclosure. In some embodiments, an audio frame at a boundary (e.g., at the cut points around the edit region, or at the beginning or end of the unedited audio portion) may have a different length than other audio frames. Alternatively, however, the input audio data 105 may be padded as needed to ensure that all audio frames have an equal length.

At block 520, the process 500 involves applying the pitch generation model 160 to the sequence of audio frames. In the case of an audio frame including a phoneme from the unedited audio data in the unedited audio portion, the actual pitch value of that phoneme may be input into the pitch generation model 160. In the case of an audio frame including a phoneme from the subject audio data in the edit region, however, the pitch value for that audio frame may be masked, such as by being zeroed out. Given this input data, which includes the context of pitch values in the unedited audio data of the unedited audio portion, the pitch generation model 160 may then predict a respective pitch for each audio frame in the input audio data 105.

In some embodiments, the pitches of the audio frames in the unedited audio data in the unedited audio portion may remain unchanged, regardless of the predictions made at block 520, and only the pitches in the subject audio data in the edit region are impacted by the output of pitch generation model 160. At block 525, the process 500 involves outputting the pitch contour, including a predicted pitch for each audio frame of the subject audio data. This pitch contour is thus incorporated in the target prosody for the subject audio data.

Example of a Vocoder System

As discussed above, the phoneme durations determined in the process 400 of FIG. 4 and the pitches determined in the process 500 of FIG. 5 together form a target prosody for the subject audio data in the edit region. In some embodiments, the operations system 120 applies this target prosody to the subject audio data through pitch-shifting and time-stretching to modify the subject audio data toward the target prosody. In some embodiments, the pitch-shifting and time-stretching is performed by the vocoder system 170, utilizing the neural vocoder 175. However, embodiments of the vocoder system 170 and the neural vocoder 175 are not limited to the context of a correction system 100 for corrected prosody due to editing audio data. Rather, embodiments of the vocoder system 170 or the neural vocoder 175 are useable in various contexts without requiring input from the phoneme duration model 150 or the pitch generation model 160 described herein.

Figure 6:
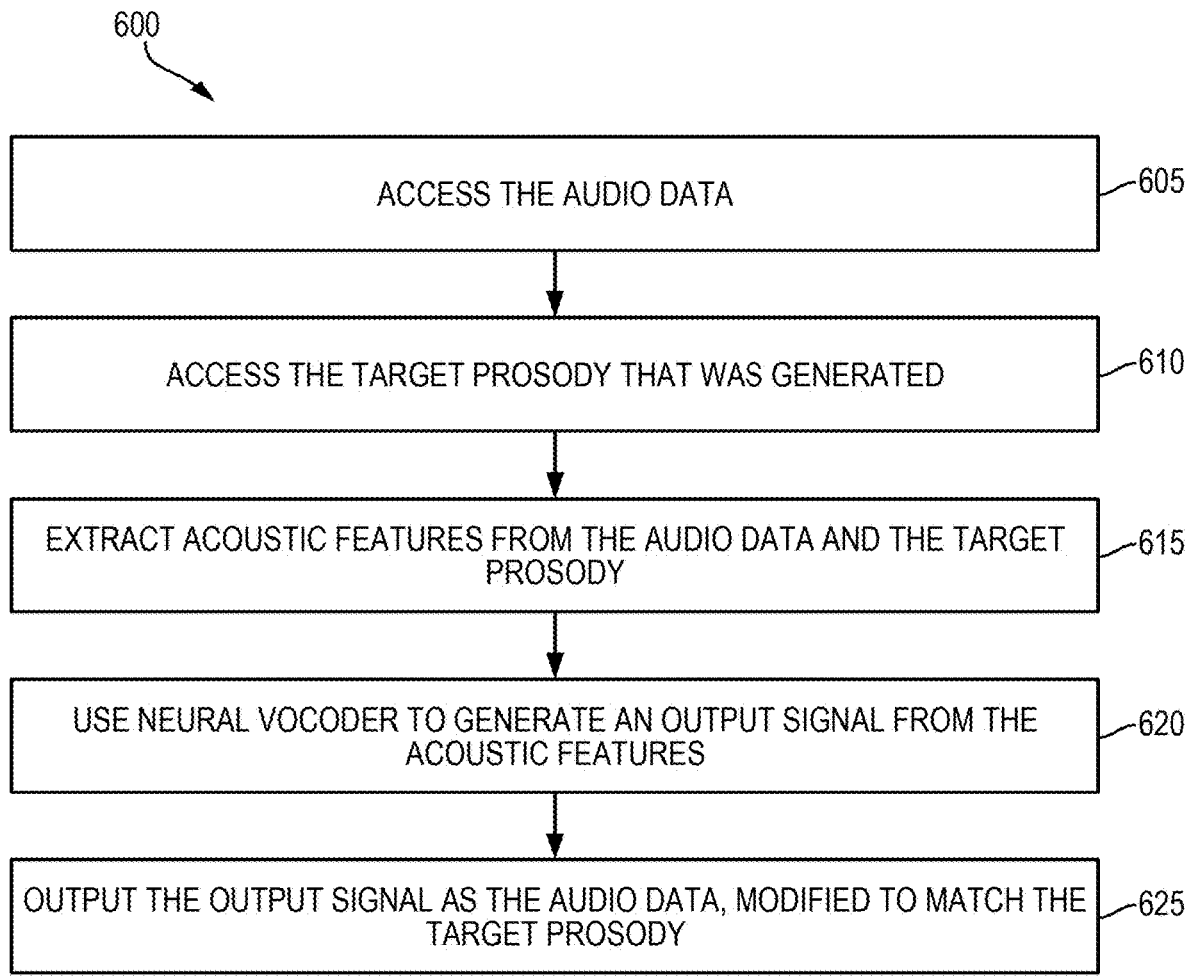
FIG. 6 is a diagram of an example of a process for pitch-shifting and time stretching as performed by a vocoder system, which can be used to correct prosody or for other purposes, according to some embodiments described herein.

FIG. 6 is a diagram of an example of a process 600 for pitch-shifting and time-stretching as performed by a vocoder system 170, which can be used to correct prosody or for other purposes, according to some embodiments described herein. As described below, the vocoder system 170 operates on audio data given a target prosody. The target prosody can include a pitch contour indicating variation of pitch values across audio frames and, in some examples, start and stop points for corresponding phonemes. The audio data can be the subject audio data of the correction system 100 when the vocoder system 170 operates as part of the correction system 100, and in that case, the target prosody may be the prosody determined by the phoneme duration model 150 and the pitch generation model 160. Additionally or alternatively, however, the audio data that the vocoder system 170 operates on is some other audio data for use in a different application requiring pitch-shifting and time-stretching, and the target prosody could have been generated by some other technique. Various implementations are possible and are within the scope of this disclosure.

In some embodiments, this process 600 described below is performed by a vocoder system 170 described herein. If incorporated in a correction system 100 as described herein, the vocoder system 170 can use this process 600 or similar to implement block 330 of the above process 300 illustrated in FIG. 3. The process 600 depicted in FIG. 6 may be implemented in software executed by one or more processing units of a computing system, implemented in hardware, or implemented as a combination of software and hardware. This process 600 is intended to be illustrative and non-limiting. Although FIG. 6 depicts various processing operations occurring in a particular order, the particular order depicted is not required. In certain alternative embodiments, the processing may be performed in a different order, some operations may be performed in parallel, or operations may be added, removed, or combined together.

As shown in FIG. 6, at block 605, the process 600 involves accessing audio data. For example, when the vocoder system 170 is incorporated into a correction system 100 described herein, the audio data may be the subject audio data from the edit region of an audio recording. At block 610, the process 600 involves accessing a target prosody. For example, when the vocoder 170 is incorporated into a correction system 100 described herein, the target prosody may have been generated as described above. In either case, the target prosody may include information describing phoneme durations, pitch values of audio frames, or a combination of both.

At block 615, the process involves extracting acoustic features from the audio data and from the target prosody. In some embodiments, a set of respective acoustic features are extracted for each input sample of the audio data and the target prosody. The acoustic features are representations of the input sample in a format that can be operated on by the neural vocoder 175; for instance, the acoustic features are one- or multi-dimensional numerical values. In some embodiments, the feature extraction subsystem 270 of the vocoder system 170 performs operations involved in extracting features, and these operations will be described in detail below.

At block 620, the process 600 involves using the neural vocoder 175 to generate an output signal (e.g., waveform) from the acoustic features. To this end, in some embodiments, a sequence of acoustic features is input into the neural vocoder 175 representing a sequence of samples of the audio data and the target prosody. The neural vocoder 175 processes the acoustic features and outputs, as its output signal, a version of the audio data that has been modified based on the target prosody. More specifically, the audio data now has a prosody matching, or at least closer to, the target prosody. At block 625, the vocoder system 170 outputs the output signal as the audio data, modified based on the target prosody.

As discussed above, when the vocoder system 170 is incorporated into a correction system 100, the operations system 120 of the correction system 100 may then output the audio data, which has been modified from the subject audio data to correct its prosody as described above. In some embodiments, the operations system 120 outputs the audio data without the unedited audio portion, to enable the edited audio data to be combined with the unedited audio portion elsewhere, or the operations system 120 outputs output audio data 195 including the edited audio data in the edit region combined with the unedited audio data in the unedited audio portion. Various implementations are possible and are within the scope of this disclosure.

Figure 7:
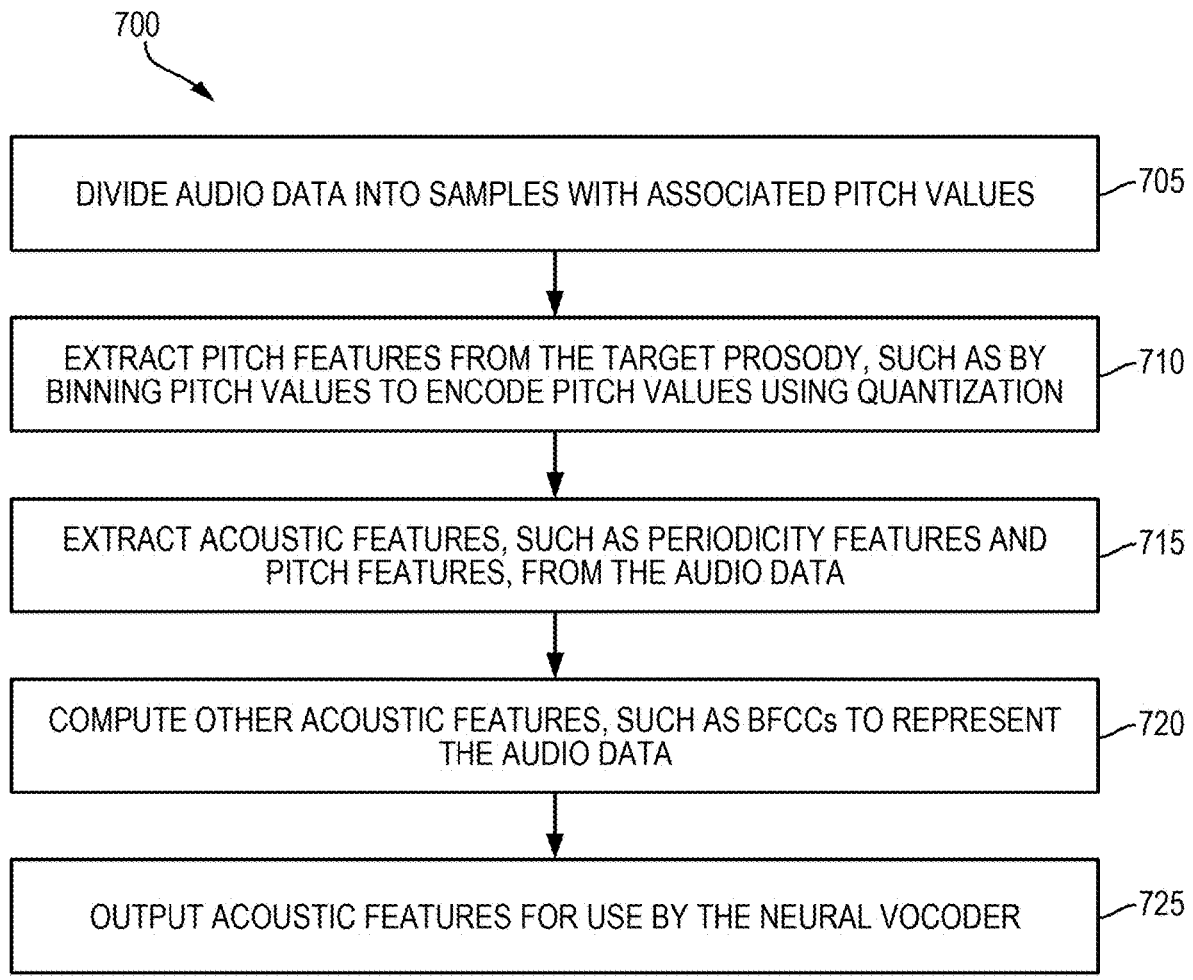
FIG. 7 is a diagram of an example of a process for extracting acoustic features from audio data input into the vocoder system, according to some embodiments described herein.

FIG. 7 is a diagram of an example of a process 700 for extracting acoustic features from audio data input into the vocoder system 170, according to some embodiments described herein. The vocoder system 170 can use this process 700 or similar as part of block 615 of the above process 600 illustrated in FIG. 6, to determine acoustic features for input into the neural vocoder 175. Additionally or alternatively, as described in more detail below, the vocoder system 180 could use this process 700 or similar to extract acoustic features during training of the neural vocoder 175.

The process 700 depicted in FIG. 7 may be implemented in software executed by one or more processing units of a computing system, implemented in hardware, or implemented as a combination of software and hardware. This process 700 is intended to be illustrative and non-limiting. Although FIG. 7 depicts various processing operations occurring in a particular order, the particular order depicted is not required. In certain alternative embodiments, the processing may be performed in a different order, some operations may be performed in parallel, or operations may be added, removed, or combined together. Indeed, in some embodiments, some or all blocks of this process 700 are performed in streaming fashion.

As shown in FIG. 7, at block 705, the process 700 involves dividing the audio data into samples, with each sample associated with a corresponding pitch value. As described above, an example of the pitch generation model 160 assigns a pitch value per audio frame. In some embodiments, multiple samples make up a frame, and thus the pitch value for a sample is equal to the pitch value for the audio frame to which the sample belongs.

In some embodiments, the feature extraction subsystem 270 extracts a set of acoustic features representing the audio data and the target prosody. For instance, the feature extraction subsystem 270 can extract pitch features from either the target prosody or the audio data, or both, and the feature extraction subsystem 270 can extract periodicity features and cepstral coefficients from the audio data. The acoustic features represent the audio data and the target prosody and are then used as input into the neural vocoder 175. Blocks 710-720 below describe examples of extracting such acoustic features.

At block 710, the process 700 involves computing (i.e., extracting) pitch features from the target prosody by quantizing the pitch values. For instance, the vocoder system 170 quantizes the pitch values by binning the pitch values of the samples. A drawback of LPCNet is that pitch values are encoded as the number of samples per audio frame. This design makes pitch bins perceptually uneven, such that higher frequencies are coarsely sampled with some bin widths even exceeding 50 cents, where a "cent" is a measure of interval frequency ratio. Given 8-bit quantization at a sample rate of 16 kHz, the minimum representable frequency in LPCNet is therefore 63 Hz, which prohibits modeling particularly low-pitched voices. In some examples, however, the vocoder system 170 utilizes a quantization of the frequency range 50-550 Hz, in which pitch bins to which the pitch values are assigned are equally spaced in base-2 log scale. This results in equal-width pitch bins in terms of cents, specifically, with each pitch bin being 16.3 cents wide in these examples. In some embodiments, the pitch value of each sample is assigned to exactly one pitch bin; in other embodiments, however, a pitch value could be assigned to multiple pitch bins, depending on how the quantization is defined.

At block 715, the process 700 involves extracting periodicity features and, optionally, pitch features from the audio data received as input into the vocoder system 170. Conventional LPCNet utilizes YIN pitch and periodicity, which exhibits significant noise. To avoid unnecessary noise, some embodiments described herein use a novel technique for extracting pitch features and periodicity features. For instance, the feature extraction subsystem 270 uses one or more of the following techniques: applying a prediction model to the audio data to determine the pitch features and periodicity features, applying Viterbi decoding to a sequence of frames of posterior pitch distributions to determine the pitch features and periodicity features, or applying volume thresholding to prevent low-bit periodic noise from exhibiting high periodicity.

In some embodiments, the feature extraction subsystem 270 uses Crepe, specifically torchcrepe for example, to extract the pitch features and periodicity features from the audio data. Crepe outputs a distribution over quantized pitch values over time. An example of the feature extraction subsystem 270 uses Crepe with Viterbi decoding to extract a smooth pitch trajectory, which reduces half- and double-frequency errors. To compute the pitch features, the feature extraction subsystem 270 may dither the extracted pitch with random noise drawn from a triangular distribution, which may be centered at zero and may have a width equal to two Crepe pitch bins (i.e., 40 cents). This can reduce the quantization error without increasing the noise floor. Using Crepe, the periodicity features are the sequence of probabilities associated with pitch bins selected by Viterbi decoding. Crepe normalizes each audio frame of audio data (e.g., the subject audio data of the correction system 100), which causes Crepe to be invariant to amplitude. This can undesirably cause low-bit noise to be labeled as periodic during silent regions. However, some embodiments avoid this drawback by setting the periodicity feature to zero in audio frames where the A-weighted loudness is less than −60 dB relative to a reference of 20 dB.

At block 720, the process 700 involves computing other acoustic features to represent the audio data as needed. To this end, in some embodiments, the feature extraction subsystem 270 also determines cepstral coefficients, such as Bark-frequency cepstral coefficients (BFCCs), to represent and encode the audio data. For instance, feature extraction subsystem 270 generates eighteen BFCCs, such as through the use of one or more techniques known in the art, to use as input acoustic features for the neural vocoder 175.

At block 725, the process 700 involves outputting the acoustic features for use by the neural vocoder. As described above, those acoustic features can include a pitch feature, a periodicity feature, and a set of cepstral coefficients such a BFCCs.

Figure 8:
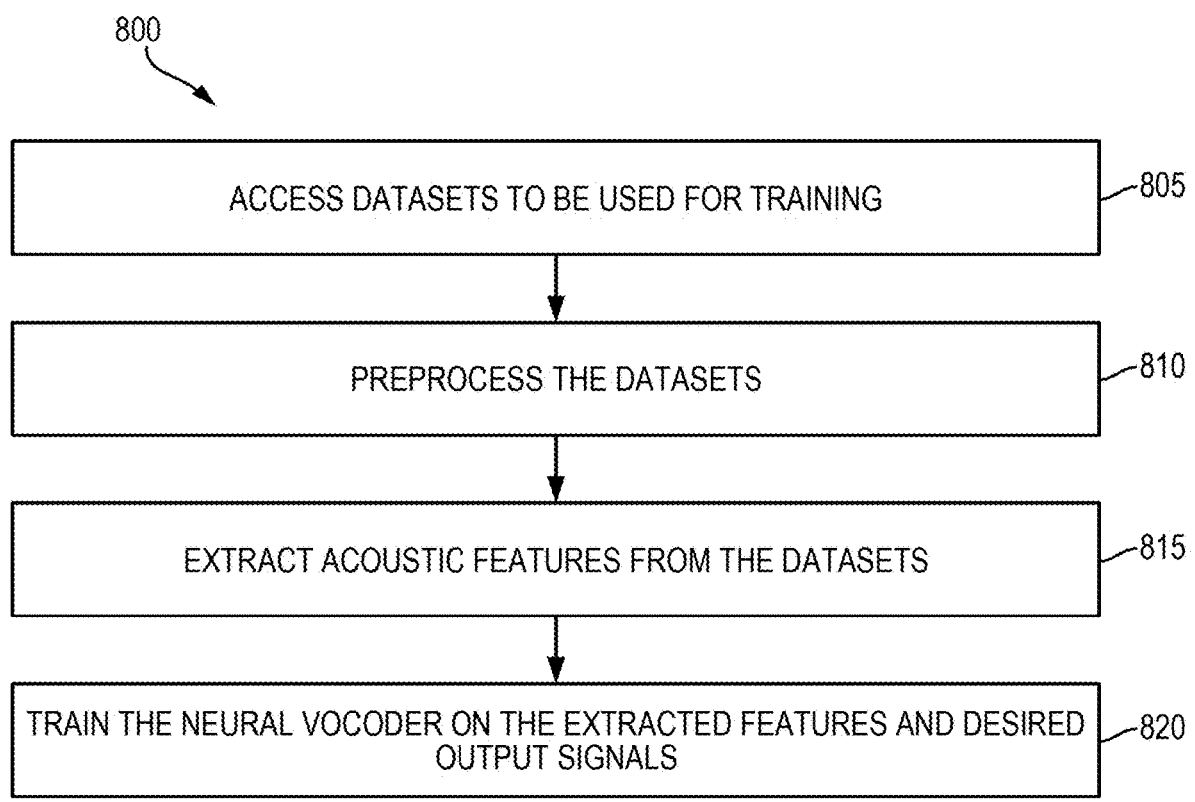
FIG. 8 is a diagram of an example of a process for training a neural vocoder of the vocoder system, according to some embodiments described herein.

FIG. 8 is a diagram of an example of a process for training the neural vocoder 175 of the vocoder system 170, according to some embodiments described herein. In some embodiments, this process 800 is performed by the training system 110 and involves the neural vocoder 175. Further, this process 800 or similar is performed prior to operation of the neural vocoder 175. The training system 110 can use this process 800 or similar to implement some aspects of block 305 of the above process 300 illustrated in FIG. 3. The process 800 depicted in FIG. 8 may be implemented in software executed by one or more processing units of a computing system, implemented in hardware, or implemented as a combination of software and hardware. This process 800 is intended to be illustrative and non-limiting. Although FIG. 8 depicts various processing operations occurring in a particular order, the particular order depicted is not required. In certain alternative embodiments, the processing may be performed in a different order, some operations may be performed in parallel, or operations may be added, removed, or combined together.

As shown in FIG. 8, at block 805, the process 800 involves accessing one or more datasets to be used for training the neural vocoder 175. In one example, the datasets represent approximately a hundred speakers, and four male-presenting voices and four female-presenting voices are withheld for validation or testing. To enable later evaluation on unseen utterances by speakers seen during training, four utterances per speaker may be withheld from an additional four male-presenting voices and four female-presenting voices whose other utterances are not withheld. Various other implementations are possible and are within the scope of this disclosure.

At block 810, the process 800 involves preprocessing the datasets. Preprocessing may be used to prepare the datasets as needed to ensure the datasets are in the appropriate form to be used for training. The type of preprocessing performed can be dependent on the datasets used. In one example, the voice cloning toolkit (VCTK) dataset could be used. In that case, the audio in the datasets could be resampled to 16 kHz, and a fifth-order Butterworth high-pass filter with a 65 Hz cutoff could be applied to remove the 50 Hz hum in the VCTK dataset. This filter is shallow enough for the neural vocoder 175 to perform accurate pitch-shifting below the cutoff. A preemphasis filter with a coefficient of 0.85 could be applied, followed by a limiter to prevent clipping. Crepe pitch could be extracted from the audio prior to preemphasis. In some examples, the utterances with a peak amplitude less than 0.2 could be normalized to have a peak amplitude of 0.4. Again, various other implementations are possible and are within the scope of this disclosure.

At block 815, the process 800 involves extracting acoustic features from the datasets. This can be performed in a manner the same or similar to the process 700 described above with reference to FIG. 7.

At block 820, the process involves training the neural vocoder 175 using the acoustic features extracted in block 815, thereby teaching the neural vocoder 175 to minimize the error between its output and the desired output audio data for each utterance used for training. As such, the neural vocoder 175 can learn to map audio data to modified audio data having shifted pitch or stretched rhythm.

Example of a Computing System

Figure 9:
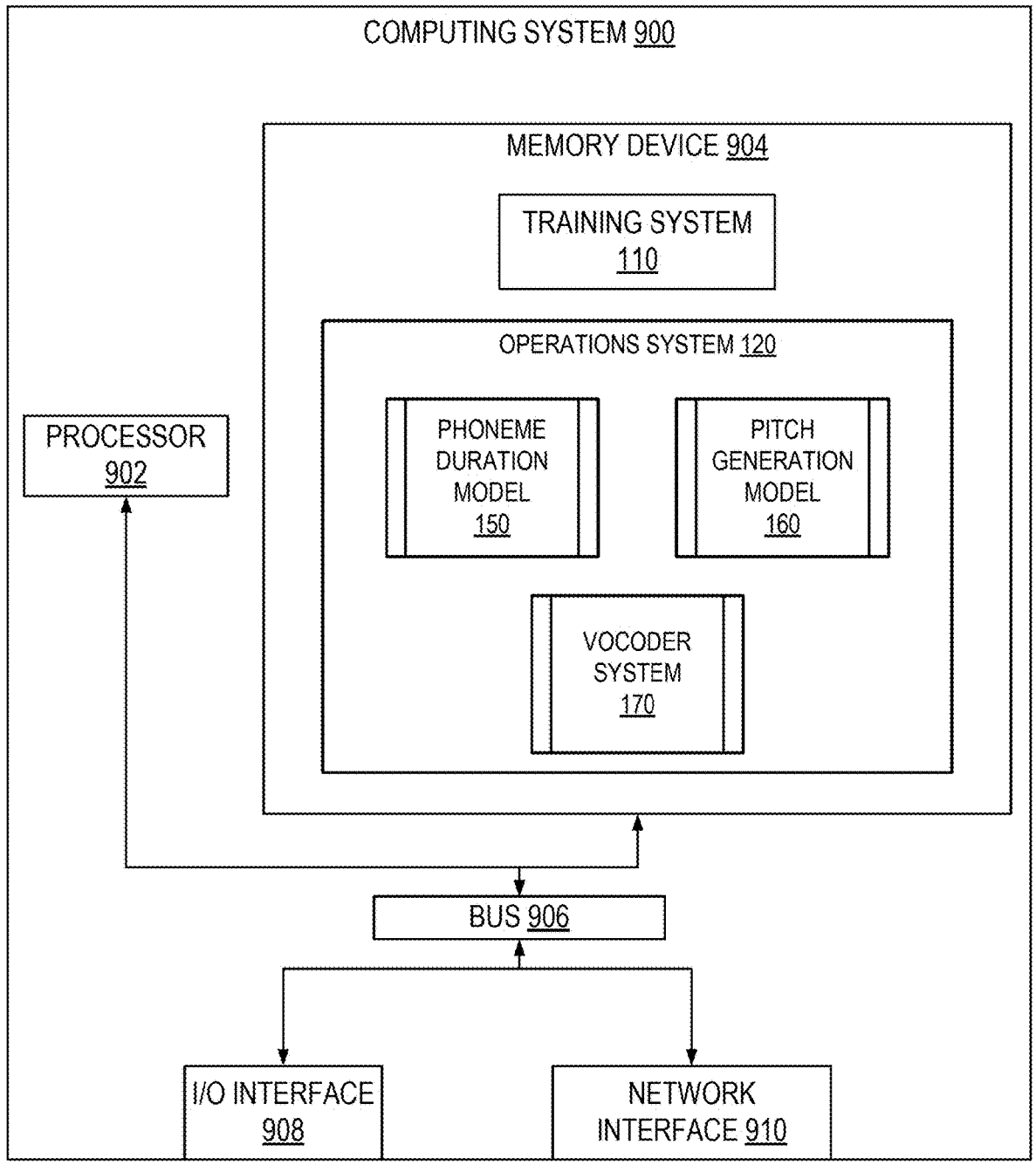
FIG. 9 is a diagram of an example of a computing system for performing certain operations described herein, according to some embodiments.

A suitable computing system or group of computing systems can be used for performing the operations described herein. For example, FIG. 9 depicts an example of a computing system 900 that can be used to execute the training system 110, the operations system 120, or various other aspects of the correction system described herein. In some embodiments, for instance, the computing system 900 executes all or a portion of the training system 110, the operations system 120, or both. In other embodiments, the computing system 900 executes the operations system 120, and an additional computing system having devices similar to those depicted in FIG. 9 (e.g., a processor, a memory, etc.) executes the training system 110.

The depicted example of a computing system 900 includes a processor 902 communicatively coupled to one or more memory devices 904. The processor 902 executes computer-executable program code stored in a memory device 904, accesses information stored in the memory device 904, or both. Examples of the processor 902 include a microprocessor, an application-specific integrated circuit ("ASIC"), a field-programmable gate array ("FPGA"), or any other suitable processing device. The processor 902 can include any number of processing devices, including a single processing device.

The memory device 904 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 900 may also include a number of external or internal devices, such as input or output devices. For example, the computing system 900 is shown with one or more input/output ("I/O") interfaces 908. An I/O interface 908 can receive input from input devices or provide output to output devices. One or more buses 906 are also included in the computing system 900. The bus 906 communicatively couples one or more components of a respective one of the computing system 900.

The computing system 900 executes program code that configures the processor 902 to perform one or more of the operations described herein. The program code includes, for example, the phoneme duration model 150, the pitch generation model 160, the vocoder system 170, or other suitable models, subsystems, or applications that perform one or more operations described herein. The program code may be resident in the memory device 904 or any suitable computer-readable medium and may be executed by the processor 902 or any other suitable processor. In some embodiments, both the training system 110 and the operations system 120 are stored in the memory device 904, as depicted in FIG. 9. In additional or alternative embodiments, one or more of the training system 110 and the operations system 120 are stored in different memory devices of different computing systems. In additional or alternative embodiments, the program code described above is stored in one or more other memory devices accessible via a data network.

The computing system 900 can access the ML models of the correction system 100 or other models, datasets, or functions in any suitable manner. In some embodiments, some or all of one or more of these models, datasets, and functions are stored in the memory device 904 of a common computer system 900, as in the example depicted in FIG. 9.

In other embodiments, such as those in which the training system 110 is executed on a separate computing system, that separate computing system that executes the training system 110 can provide access to the ML models described herein to enable execution of the operations system 120 on the computing system 900. In additional or alternative embodiments, one or more programs, models, datasets, and functions described herein are stored in one or more other memory devices accessible via a data network.

The computing system 900 also includes a network interface device 910. The network interface device 910 includes any device or group of devices suitable for establishing a wired or wireless data connection to one or more data networks. Non-limiting examples of the network interface device 910 include an Ethernet network adapter, a modem, and the like. The computing system 900 is able to communicate with one or more other computing devices (e.g., a separate computing device acting as a client device 130) via a data network using the network interface device 910.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method in which one or more processing devices perform operations comprising:
    identifying, using a transcript of a speaker, audio data from an edit region of an audio recording of the speaker as distinct from an unedited audio portion of the audio recording, the audio data having a first prosody;
    applying a phoneme duration model to the audio data to predict phoneme durations;
    applying, using the phoneme durations, a pitch generation model to the audio data to provide a target prosody for the audio data, wherein the target prosody differs from the first prosody;
    computing acoustic features representing samples, wherein computing respective acoustic features for a sample of the samples comprises:
        computing a pitch feature as a quantized pitch value of the sample by assigning a pitch value of at least one of the target prosody or the audio data to at least one of a set of pitch bins, wherein each pitch bin of the set of pitch bins has an equal width in cents; and
        computing, from the audio data, a periodicity feature and additional acoustic features for the sample,
        wherein the respective acoustic features for the sample comprise the pitch feature, the periodicity feature, and the additional acoustic features;
    applying a neural vocoder to the acoustic features to pitch-shift and time-stretch the audio data from the first prosody toward the target prosody to produce edited audio data; and
    combining the edited audio data with the unedited audio portion of the audio recording.

2. The method of claim 1, wherein computing the pitch feature and the periodicity feature further comprises applying a prediction model to the audio data.

3. The method of claim 1, the operations further comprising dithering the pitch feature with random noise from a triangular distribution.

4. The method of claim 1, wherein computing the pitch feature further comprises using a quantization of a particular frequency range that is equally spaced in base-2 log scale.

5. The method of claim 1, wherein the neural vocoder is configured to:
    generate a probability distribution of possible excitation values for the sample; and
    determine a synthesized output sample by sampling the probability distribution using a constant sampling temperature.

6. The method of claim 5, wherein computing the additional acoustic features for the sample comprises encoding the audio data corresponding to the sample as Bark-frequency cepstral coefficients (BFCCs) for input to the neural vocoder.

7. The method of claim 6, the operations further comprising:
    computing a prediction value via linear predictive coding (LPC), wherein LPC coefficients are derived from the BFCCs, wherein the neural vocoder is further configured to combine the prediction value with a result of sampling the probability distribution to determine the synthesized output sample.

8. The method of claim 1, the operations further comprising training the neural vocoder to map the acoustic features to an output audio signal.

9. The method of claim 8, wherein training the neural vocoder comprises:
accessing a training dataset for the neural vocoder; and
performing resampling data augmentation on the training dataset using a resampling function dependent on one or more values of a pitch shift factor.

10. The method of claim 8, wherein the speaker of the audio data is distinct from a set of speakers on which the neural vocoder is trained.

11. A system comprising:
a feature extraction subsystem configured to:
receive a transcript of a speaker and audio data from an edit region of an audio recording of the speaker as distinct from an unedited portion of the audio recording
apply a phoneme duration model to the audio data to predict phoneme durations;
apply, using the phoneme durations, a pitch generation model to the audio data to provide a target prosody for the audio data, the target prosody including a target pitch contour; and
compute acoustic features representing samples, wherein respective acoustic features for a sample of the samples comprise (i) a pitch feature representing at least one of the target pitch contour or the audio data and (ii) a periodicity feature and cepstral coefficients representing the audio data;
a neural vocoder configured to:
input the acoustic features for the sample;
generate a probability distribution of possible excitation values for the sample based on the acoustic features; and
determine a synthesized output sample by sampling the probability distribution using a constant sampling temperature; and
an operations subsystem configured to provide output audio data including the synthesized output sample, the output audio data configured to be combined with the unedited portion of the audio recording.

12. The system of claim 11, wherein the feature extraction subsystem is further configured to compute the pitch feature by quantizing a pitch value corresponding to the sample by assigning the pitch value to at least one of a set of pitch bins, wherein each pitch bin of the set of pitch bins has an equal width in cents.

13. The system of claim 11, wherein the neural vocoder is configured to pitch-shift and time-stretch the audio data from a first prosody toward the target prosody.

14. The system of claim 11, wherein the neural vocoder comprises:
a frame-rate network configured to generate an embedding representing the samples; and
a sample-rate network configured to compute the probability distribution of possible excitation values.

15. The system of claim 11, further comprising a training system configured to:
access a dataset for training the neural vocoder;
generate a training dataset by performing resampling data augmentation on the dataset using a resampling function dependent on one or more values of a pitch shift factor; and
train the neural vocoder using the training dataset.

16. The system of claim 15, wherein the speaker of the audio data is distinct from a set of speakers on which the neural vocoder is trained.

17. A non-transitory computer-readable medium embodying program code for pitch-shifting and time-stretching audio data, the program code comprising instructions that, when executed by a processor, cause the processor to perform operations comprising:
identifying, using a transcript of a speaker, audio data from an edit region of an audio recording of the speaker as distinct from an unedited audio portion of the audio recording, the audio data having a first prosody;
applying a phoneme duration model to the audio data to predict phoneme durations;
applying, using the phoneme durations, a pitch generation model to the audio data to provide a target prosody for the audio data, wherein the target prosody differs from the first prosody;
a step for computing acoustic features representing samples, wherein computing respective acoustic features for a sample of the samples comprises:
computing a pitch feature as a quantized pitch value of the sample by assigning a pitch value of at least one of the target prosody and the audio data to at least one of a set of pitch bins, wherein each pitch bin of the set of pitch bins has an equal width in cents; and
computing, from the audio data, a periodicity feature and additional acoustic features for the sample,
wherein the respective acoustic features for the sample comprise the pitch feature, the periodicity feature, and the additional acoustic features;
a step for applying a neural vocoder to the acoustic features to pitch-shift and time-stretch the audio data from the first prosody toward the target prosody; and
combining the edited audio data with the unedited audio portion of the audio recording.

18. The non-transitory computer-readable medium of claim 17, wherein computing the pitch feature and the periodicity feature further comprises:
applying a prediction model to the audio data to determine the quantized pitch value; and
dithering the quantized pitch value with random noise.

19. The non-transitory computer-readable medium of claim 17, wherein the neural vocoder is configured to:
generate a probability distribution of possible excitation values for the sample; and
determine a synthesized output sample by combining (i) a sampling of the probability distribution using a constant sampling temperature and (ii) a prediction value computed via linear predictive coding (LPC) with LPC coefficients derived from cepstral coefficients representing the audio data.

20. The non-transitory computer-readable medium of claim 17, the operations further comprising:
accessing a dataset for training the neural vocoder;
generating a training dataset by performing resampling data augmentation on the dataset using a resampling function dependent on one or more values of a pitch shift factor; and
training the neural vocoder using the training dataset.

* * * * *